United States Patent
Tsai et al.

(10) Patent No.: US 12,422,825 B2
(45) Date of Patent: Sep. 23, 2025

(54) CONTROL METHOD APPLIED TO SERVOMOTOR AND ASSOCIATED PROCESSING CIRCUIT

(71) Applicant: Elite Semiconductor Microelectronics Technology Inc., Hsinchu (TW)

(72) Inventors: Ming-Fu Tsai, Hsinchu (TW); Sheng-Hung Hsu, Hsinchu (TW)

(73) Assignee: Elite Semiconductor Microelectronics Technology Inc., Hsinchu (TW)

( * ) Notice: Subject to any disclaimer, the term of this patent is extended or adjusted under 35 U.S.C. 154(b) by 379 days.

(21) Appl. No.: 18/110,340

(22) Filed: Feb. 15, 2023

(65) Prior Publication Data

US 2024/0272616 A1 Aug. 15, 2024

(51) Int. Cl.
  *G05B 19/4155* (2006.01)
(52) U.S. Cl.
  CPC ......... *G05B 19/4155* (2013.01); *G05B 2219/34013* (2013.01)
(58) Field of Classification Search
  CPC ...... H02P 6/10; H02P 6/06; H02P 6/08; H02P 27/08; H02K 11/33; G05B 19/4155
  See application file for complete search history.

(56) References Cited

U.S. PATENT DOCUMENTS

| 5,210,476 A | 5/1993 | Kazato |
| 2006/0197484 A1* | 9/2006 | Ohashi ............... G05B 19/19 318/567 |
| 2009/0195206 A1 | 8/2009 | Aoyama |
| 2013/0264988 A1 | 10/2013 | Iwashita |
| 2017/0324365 A1 | 11/2017 | Tsui |

FOREIGN PATENT DOCUMENTS

| CN | 108199642 A | 6/2018 |
| KR | 20160012602 A * | 2/2016 |

* cited by examiner

*Primary Examiner* — Said Bouziane
(74) *Attorney, Agent, or Firm* — Winston Hsu

(57) ABSTRACT

A control method applied to a servomotor, wherein the servomotor includes a motor, and the control method includes: setting a mode of the servomotor as a predetermined mode corresponding to a predetermined communication protocol; receiving an input signal from a controller for controlling the motor, wherein the controller is coupled to the servomotor; and switching the mode of the servomotor from the predetermined mode to one of a plurality of candidate modes according to a frequency of the input signal.

18 Claims, 4 Drawing Sheets

CONTROL METHOD APPLIED TO SERVOMOTOR AND ASSOCIATED PROCESSING CIRCUIT

BACKGROUND OF THE INVENTION

1. Field of the Invention

The present invention is related to a servomotor, and more particularly, to a processing circuit applied to the servomotor and an associated control method.

2. Description of the Prior Art

For different controllers applied to a servomotor, the controllers may support a pulse position modulation (PPM) signal, a pulse width modulation (PWM) signal, different communication protocols and/or a combination of the PPM signal, the PWM signal, and the different communication protocols. For a traditional servomotor, different hardware interfaces corresponding to each of the different communication protocols, the PPM signal, and the PWM signal, respectively, may be required to support the different communication protocols, the PPM signal, and the PWM signal, or additional enabling circuits or switches may be required to select one of multiple operating modes of the servomotor that correspond to the different communication protocols, the PPM signal, and the PWM signal, which will result in increased production cost and inconvenience to users. As a result, a novel processing circuit applied to the servomotor that can automatically switch a mode of the servomotor to support the different communication protocols, the PPM signal, and the PWM signal according to a frequency and a duty cycle of an input signal through an algorithm and an associated control method are urgently needed.

SUMMARY OF THE INVENTION

It is therefore one of the objectives of the present invention to provide a processing circuit applied to a servomotor that can automatically switch a mode of the servomotor to support different communication protocols, a PPM signal, and a PWM signal according to a frequency and a duty cycle of an input signal through an algorithm and an associated control method, to address the above-mentioned issues.

According to an embodiment of the present invention, a control method applied to a servomotor is provided, wherein the servomotor comprises a motor. The control method comprises: setting a mode of the servomotor as a predetermined mode corresponding to a predetermined communication protocol; receiving an input signal from a controller for controlling the motor, wherein the controller is coupled to the servomotor; and switching the mode of the servomotor from the predetermined mode to one of a plurality of candidate modes according to a frequency of the input signal.

According to an embodiment of the present invention, a processing circuit applied to a servomotor is provided, wherein the servomotor comprises a motor, and the processing circuit comprises an input interface and a control circuit. The input interface is arranged to receive an input signal from a controller for controlling the motor, wherein the controller is coupled to the servomotor. The control circuit is arranged to: set a mode of the servomotor as a predetermined mode corresponding to a predetermined communication protocol; and switch the mode of the servomotor from the predetermined mode to one of a plurality of candidate modes according to a frequency of the input signal.

One of the benefits of the present invention is that, by the processing circuit of the present invention applied to a servomotor, a mode of the servomotor can be automatically switched to support different communication protocols, a PPM signal, and a PWM signal according to a frequency and a duty cycle of an input signal through an algorithm. In addition, when the mode of the servomotor is switched to a PPM or PWM mode, the processing circuit of the present invention can automatically switch a control mode of a motor in the servomotor to a position mode or a velocity or torque mode according to the duty cycle of the input signal. In this way, user experience can be improved and trial-and-error cost can be reduced.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
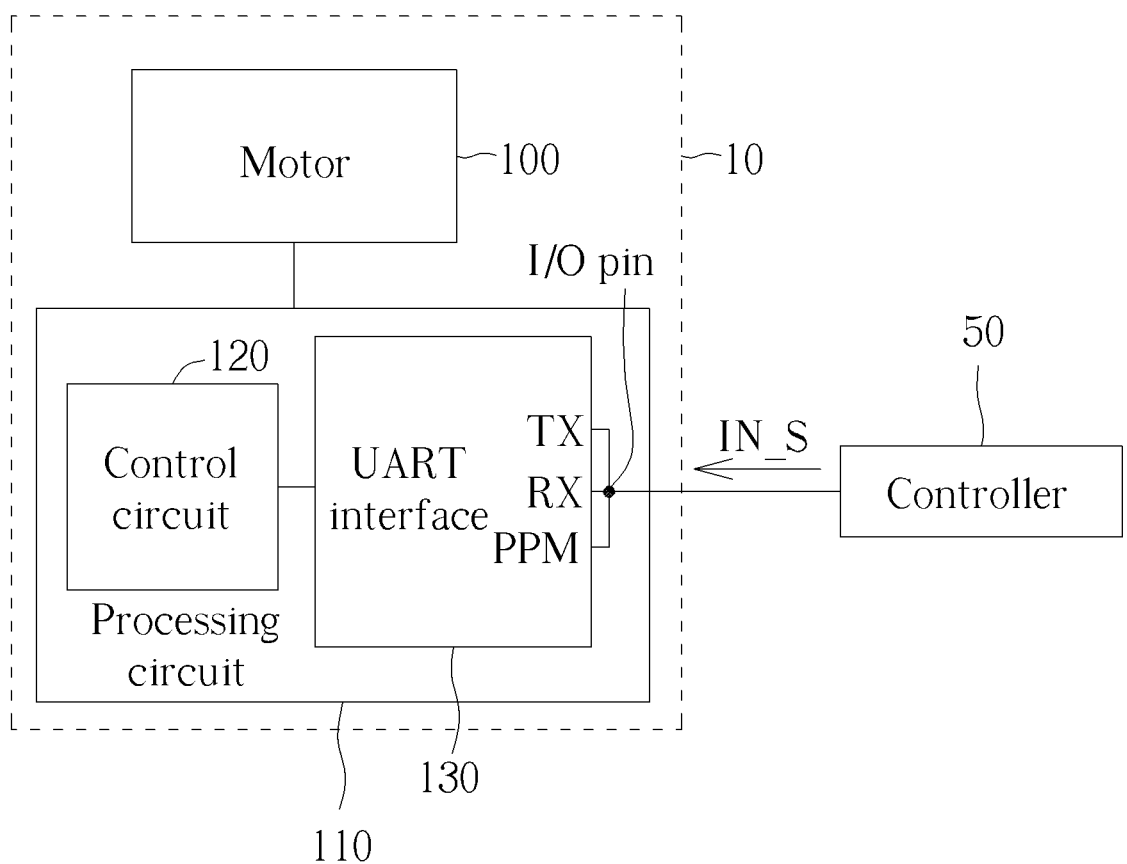
FIG. 1 is a diagram illustrating a servomotor according to an embodiment of the present invention.

FIG. 1 is a diagram illustrating a servomotor 10 according to an embodiment of the present invention. As shown in FIG. 1, the servomotor 10 may include a motor 100 and a processing circuit 110 (e.g. a micro controller unit (MCU)). By way of example, but not limitation, components of the processing circuit 100 may be mounted on a printed circuit board (PCB) that is disposed on the servomotor 10. The servomotor 10 may be arranged to receive an input signal IN_S from a controller 50 that is external to the servomotor 10 and coupled to the servomotor 10 for controlling the motor 100 (e.g. controlling a position and/or a rotational speed of the motor 100). The controller 50 may support a pulse position modulation (PPM) signal, a pulse width modulation (PWM) signal, different communication protocols, and/or a combination of the PPM signal, the PWM signal, and the different communication protocols. For example, when the controller 50 supports the PPM signal, the input signal IN_S may be a PPM signal, and the PPM signal makes a control mode of the motor 100 access a position mode PM, wherein when the control mode of the motor 100 is set as the position mode PM, a position of the motor 100 is controlled by the input signal IN_S. For another example, when the controller 50 supports a communication protocol, the input signal IN_S may correspond to the communication protocol, and may be a series of packets with a high bit rate (e.g. 115.2K bits/s or 1.5M bits/s). For still another example, when the controller 50 supports a combination of a PPM signal and a communication protocol, the input signal may be a PPM signal or may correspond to the communication protocol. In addition, under a condition that the motor 100 is controlled by the PWM signal (i.e. the input signal IN_S is the PWM signal), the control mode of the motor 100 may further include a velocity or torque mode VTM, wherein when the control mode of the motor 100 is set as the velocity or torque mode VTM, a rotational speed of the motor 100 is controlled by the input signal IN_S.

The processing circuit 110 may include a control circuit 120 and an input interface (e.g. a universal asynchronous receiver/transmitter (UART) interface 130). The UART interface 130 may be arranged to perform communications between the servomotor 10 and the controller 50 through a half-duplex communication mechanism of the UART, wherein the UART interface 130 includes a transmitting pin (labeled as "TX" in FIG. 1), a receiving pin (labeled as "RX" in FIG. 1), and a PPM pin (labeled as "PPM" in FIG. 1) that is arranged to receive the PPM signal or the PWM signal, these three pins are connected in parallel at a point (labeled as "I/O pin" in FIG. 1), and the UART interface 130 may be arranged to receive the input signal IN_S from the controller 50 through the point.

The control circuit 120 can automatically switch a mode of the servomotor 10 to support different communication protocols, the PPM signal, and the PWM signal according to a frequency FREQ and a duty cycle DC of the input signal IN_S through an algorithm. For example, the control circuit 120 can implement the algorithm by loading and executing program code to switch the mode of the servomotor 10 from a predetermined mode to one of a plurality of candidate modes according to the frequency FREQ of the input signal IN_S for successful communications between the servomotor 10 and the controller 50, wherein the candidate modes may include a PPM or PWM mode and multiple communication modes CM_1-CM_N (N≥1), and the communication modes CM_1-CM_N correspond to multiple communication protocols CP_1-CP_N, respectively. For example, the communication mode CM_1 corresponds to the communication protocol CP_1, the communication mode CM_2 corresponds to the communication protocol CP_2, and the communication mode CM_N corresponds to the communication protocol CP_N.

In the beginning, the control circuit 120 may set a mode of the servomotor 10 as a predetermined mode corresponding to a predetermined communication protocol, and then receive the input signal IN_S from the UART interface 130. After receiving the input signal IN_S, the control circuit 120 may determine whether the frequency FREQ of the input signal IN_S is constant and smaller than a specific frequency value (e.g. 2 KHz).

In response to the frequency FREQ of the input signal IN_S being constant and smaller than 2 KHz (i.e. FREQ<2 KHz), the control circuit 120 may switch the mode of the servomotor 10 from the predetermined mode to the PPM or PWM mode, and determine the input signal IN_S as a PPM signal or a PWM signal. In the PPM or PWM mode, the control circuit 120 may clean up packets in the input signal IN_S, and then determine whether the servomotor 10 stops. If the servomotor 10 does not stop, the control circuit 120 may maintain the control mode of the motor 100 as a previous control mode. For example, the previous control mode may be predetermined as one of the position mode PM and the velocity or torque mode VTM. If the servomotor 10 stops, the control circuit 120 may set the control mode of the motor 100 as the position mode PM or the velocity or torque mode VTM according to the duty cycle DC of the input signal IN_S. In this embodiment, under a condition that the duty cycle DC of the input signal IN_S is 50%, the motor 100 will be stationary. Under a condition that the duty cycle DC of the input signal IN_S is larger than 50%, the motor 100 will rotate clockwise, and the motor 100 will rotate faster when the duty cycle DC of the input signal IN_S is larger. Under a condition that the duty cycle DC of the input signal IN_S is smaller than 50%, the motor 100 will rotate counterclockwise, and the motor 100 will rotate faster when the duty cycle DC of the input signal IN_S is smaller.

When the duty cycle DC of the input signal IN_S is equal to 50%, the input signal IN_S may be determined as the PWM signal and the control circuit 120 may set the control mode of the motor 100 as the velocity or torque mode VTM. When the duty cycle DC of the input signal IN_S is not equal to 50%, the input signal IN_S may be determined as the PPM signal and the control circuit 120 may set the control mode of the motor 100 as the position mode PM. In addition, when the control mode of the motor 100 is set as the position mode PM, the control circuit 120 may be further arranged to set an angle resolution of the motor 100, and set a maximum angle value and a minimum angle value for the motor 100 to limit the movement of the motor 100.

In response to the frequency of the input signal IN_S being not constant or not smaller than 2 KHz (i.e. FREQ≥2 KHz, and the input signal IN_S is not a PPM signal or a PWM signal but a series of packets with a high bit rate), the control circuit 120 may determine whether communications between the servomotor 10 and the controller 50 is normal. If the communications between the servomotor 10 and the controller 50 is normal, the control circuit 120 may parse the input signal IN_S through the predetermined communication protocol (i.e. the mode of the servomotor 10 is maintained as the predetermined mode), and control the motor 100 according to the input signal IN_S. If the communications between the servomotor 10 and the controller 50 is abnormal, the control circuit 120 may switch the mode of the servomotor 10 from the predetermined mode to one of the communication modes CM_1-CM_N, until the communications between the servomotor 10 and the controller 50 becomes normal.

Figure 2:
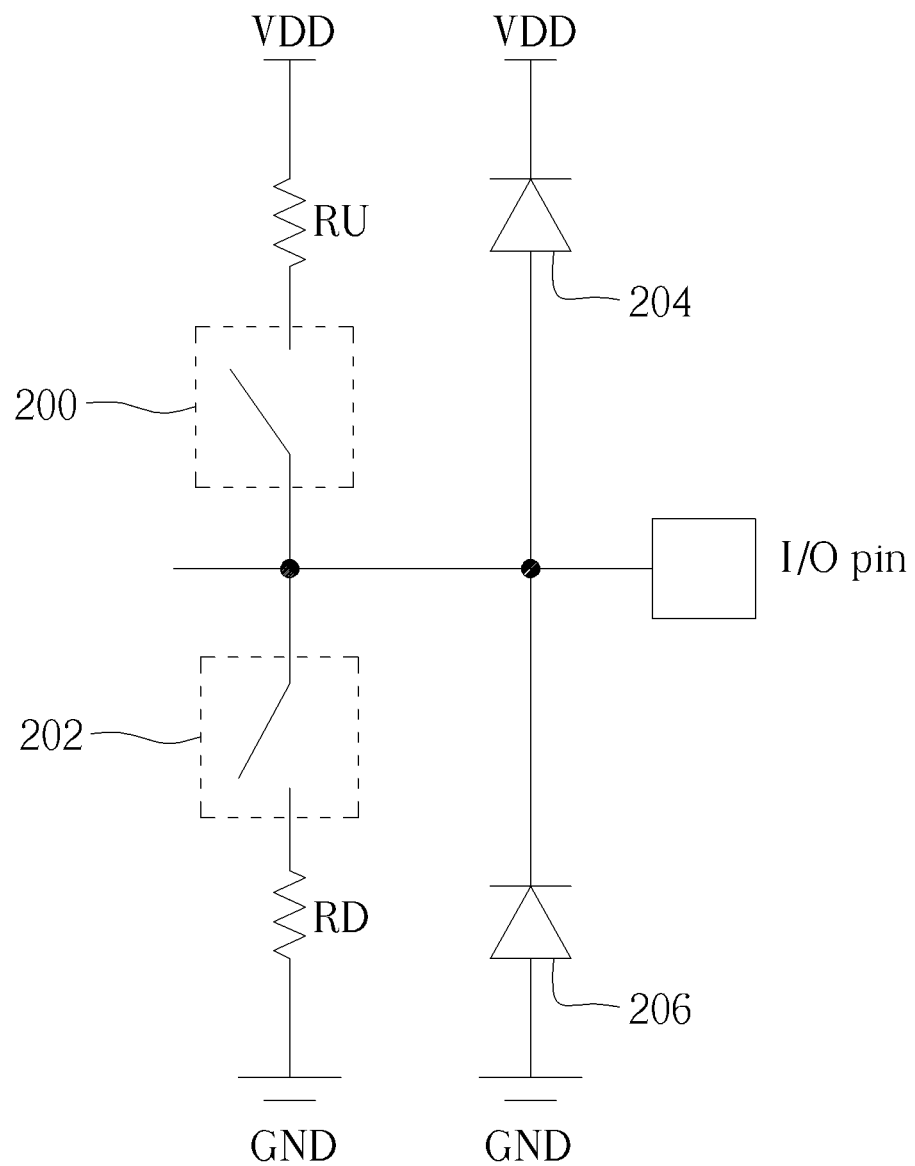
FIG. 2 is a diagram illustrating a configuration between multiple switching circuits, a pull-up resistor, and a pull-down resistor in the processing circuit for resistance-matching between the servomotor and the controller according to an embodiment of the present invention.

In detail, when the mode of the servomotor 10 is switched to one of the communication modes CM_1-CM_N (e.g. the communication mode CM_1), the control circuit 120 may clean up packets in the input signal IN_S, and then set a baud corresponding to the communication mode CM_1 (i.e. corresponding to the communication protocol CP_1) for frequency-matching between the servomotor 10 and the controller 50. In addition, since circuit board designs of different controllers have different resistor designs, under a condition that both of the servomotor 10 and the controller 50 correspond to the same baud, a voltage level at the servomotor terminal may be different from a voltage level at the controller terminal due to resistance-mismatching, which will cause the communications between the servomotor 10 and the controller 50 to be abnormal. To solve this issue, please refer to FIG. 2. FIG. 2 is a diagram illustrating a configuration between multiple switching circuits, a pull-up resistor, and a pull-down resistor in the processing circuit 110 for resistance-matching between the servomotor 10 and the controller 50 according to an embodiment of the present invention.

As shown in FIG. 2, the processing circuit 110 (more particularly, the UART interface 130) may have multiple switching circuits 200 and 202, multiple protection diodes 204 and 206, a pull-up resistor RU, and a pull-down resistor RD, wherein the switching circuit 200 corresponds to the pull-up resistor RU, and the switching circuit 202 corresponds to the pull-down resistor RD. Both of a positive terminal of the protection diode 204 and a negative terminal of the protection diode 206 are coupled to the point where three pins of the UART interface 130 (i.e. the transmitting pin, the receiving pin, and the PPM pin) are connected in parallel (labeled as "I/O pin" in FIG. 2), a negative terminal of the protection diode 204 is coupled to a first reference voltage (e.g. a supply voltage VDD), and a positive terminal of the protection diode 206 is coupled to a second reference voltage (e.g. a grounding voltage GND). The protection diodes 204 and 206 may be arranged to perform current limitation for protection. The switching circuit 200 has a first terminal coupled to the point where three pins of the UART interface 130 are connected in parallel. The pull-up resistor RU has a first terminal coupled to a second terminal of the switching circuit 200 and a second terminal coupled to the supply voltage VDD. The switching circuit 202 has a first terminal coupled to the point where three pins of the UART interface 130 are connected in parallel. The pull-down resistor RD has a first terminal coupled to a second terminal of the switching circuit 202 and a second terminal coupled to the grounding voltage GND.

When the mode of the servomotor 10 is switched to one of the communication modes CM_1-CM_N (e.g. the communication mode CM_1), the control circuit 120 may be further arranged to open and close the switching circuits 200 and 202 to adjust the voltage level at the servomotor terminal for resistance-matching between the servomotor 10 and the controller 50. In this way, under a condition that both of the servomotor 10 and the controller 50 correspond to the same baud, the communications between the servomotor 10 and the controller 50 will not be affected by the resistance-mismatching between the servomotor 10 and the controller 50.

Figure 3:
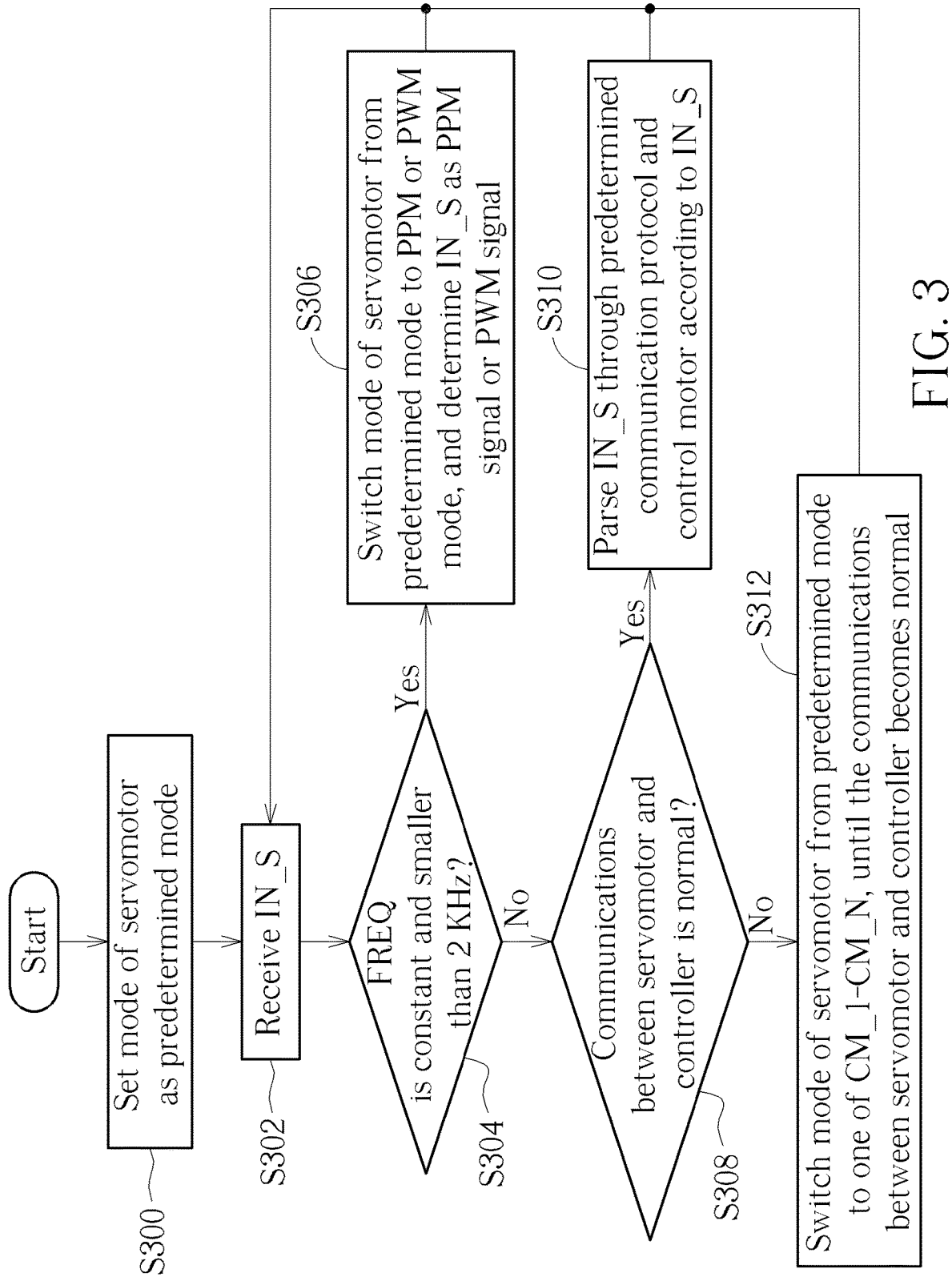
FIG. 3 is a flow chart of a control method applied to the servomotor shown in FIG. 1 according to an embodiment of the present invention.

FIG. 3 is a flow chart of a control method applied to the servomotor 10 shown in FIG. 1 according to an embodiment of the present invention. Provided that the result is substantially the same, the steps are not required to be executed in the exact order shown in FIG. 3. The control method for automatically switching a mode of the servomotor 10 to support different communication protocols, the PPM signal, and the PWM signal according to the frequency FREQ and the duty cycle DC of the input signal IN_S through an algorithm shown in FIG. 3 can be employed by the processing circuit 110 shown in FIG. 1.

In Step S300, a mode of the servomotor 10 is set as a predetermined mode corresponding to a predetermined communication protocol.

In Step S302, the input signal IN_S is received from the controller 50 through the UART interface 130.

In Step S304, it is determined that whether the frequency FREQ of the input signal IN_S is constant and smaller than a specific frequency value (e.g. 2 KHz). If yes, Step S306 is entered; if no, Step S308 is entered.

In Step S306, the mode of the servomotor 10 is switched from the predetermined mode to the PPM or PWM mode, and the input signal IN_S is determined as a PPM signal or a PWM signal.

In Step S308, it is determined that whether communications between the servomotor 10 and the controller 50 is normal. If yes, Step S310 is entered; if no, Step S312 is entered.

In Step S310, the input signal IN_S is parsed through the predetermined communication protocol (i.e. the mode of the servomotor 10 is maintained as the predetermined mode), and the motor 100 is controlled according to the input signal IN_S.

In Step S312, the mode of the servomotor 10 is switched from the predetermined mode to one of the communication modes CM_1-CM_N, until the communications between the servomotor 10 and the controller 50 becomes normal, wherein the communication modes CM_1-CM_N correspond to the communication protocols CP_1-CP_N, respectively.

Since a person skilled in the pertinent art can readily understand details of the steps shown in FIG. 3 after reading the above paragraphs, further description is omitted here for brevity.

Figure 4:
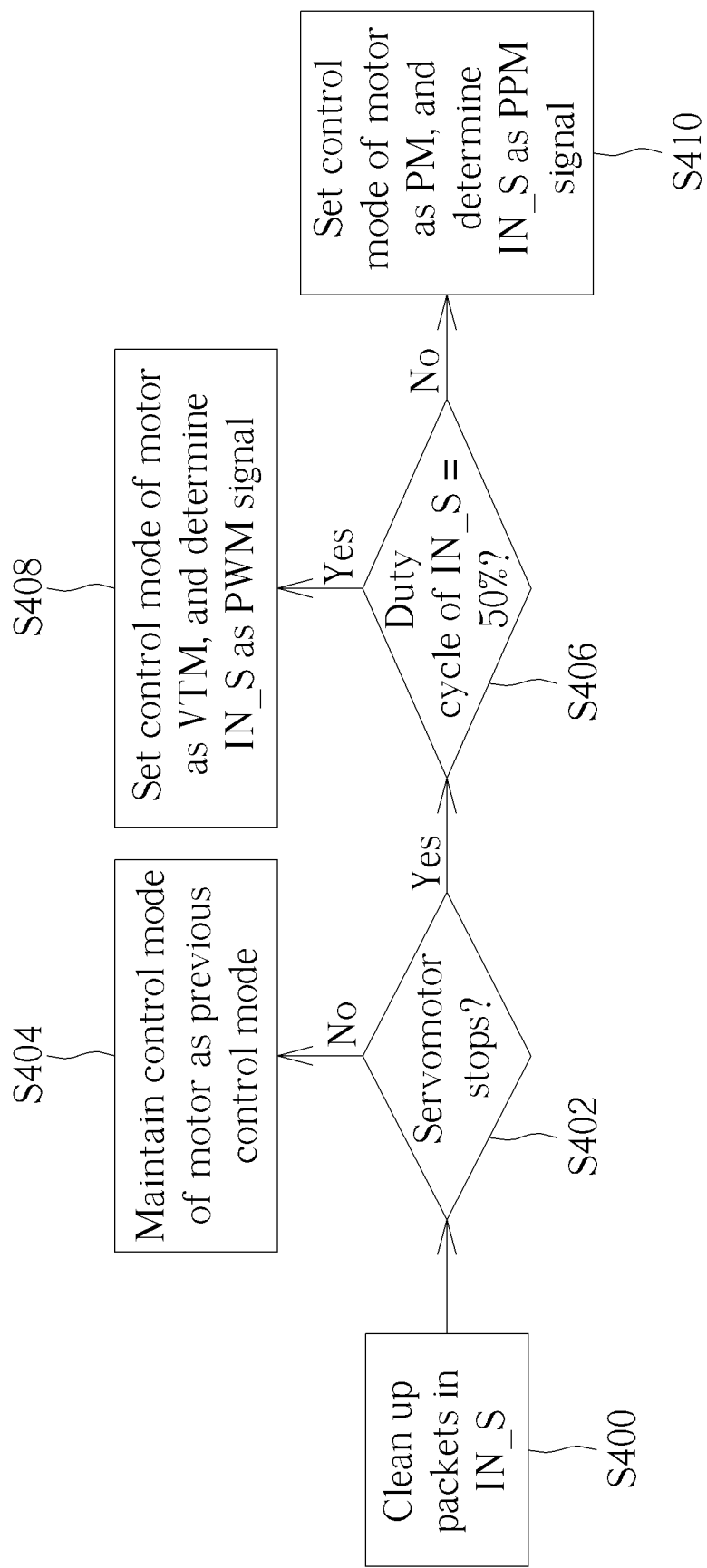
FIG. 4 is a flow chart of implementation details of the PPM or PWM mode of the servomotor shown in FIG. 1 according to an embodiment of the present invention.

FIG. 4 is a flow chart of implementation details of the PPM or PWM mode of the servomotor 10 shown in FIG. 1 according to an embodiment of the present invention. Provided that the result is substantially the same, the steps are not required to be executed in the exact order shown in FIG. 4. The implementation details of the PPM or PWM mode of the servomotor 10 can be employed by the control circuit 120 shown in FIG. 1.

In Step S400, packets in the input signal IN_S are cleaned up.

In Step S402, it is determined that whether the servomotor 10 stops. If yes, Step S406 is entered; if no, Step S404 is entered.

In Step S404, the control mode of the motor 100 is maintained as a previous control mode. For example, the previous control mode may be predetermined as one of the position mode PM and the velocity or torque mode VTM.

In Step S406, it is determined that whether the duty cycle DC of the input signal IN_S is equal to a specific ratio (e.g. 50%). If yes, Step S408 is entered; if no, Step S410 is entered.

In Step S408, the control mode of the motor 100 is set as the velocity or torque mode VTM, and the input signal IN_S is determined as the PWM signal. In the velocity or torque mode VTM, a rotational speed of the motor 100 is controlled by the input signal IN_S.

In Step S410, the control mode of the motor 100 is set as the position mode PM, and the input signal IN_S is determined as the PPM signal. In the position mode PM, an angle resolution, a maximum angle value, and a minimum angle value are set for the motor 100 to limit the movement of the motor 100, and a position of the motor 100 is controlled by the input signal IN_S.

Since a person skilled in the pertinent art can readily understand details of the steps shown in FIG. 4 after reading the above paragraphs, further description is omitted here for brevity.

In summary, by the processing circuit of the present invention applied to a servomotor, a mode of the servomotor can be automatically switched to support different communication protocols, a PPM signal, and a PWM signal according to a frequency and a duty cycle of an input signal through an algorithm. In addition, when the mode of the servomotor is switched to the PPM or PWM mode, the processing circuit of the present invention can automatically switch a control mode of a motor in the servomotor to a position mode or a velocity or torque mode according to the duty cycle of the input signal. In this way, user experience can be improved and trial-and-error cost can be reduced.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A control method applied to a servomotor, wherein the servomotor comprises a motor, and the control method comprises:
   setting a mode of the servomotor as a predetermined mode corresponding to a predetermined communication protocol;
   receiving an input signal from a controller for controlling the motor, wherein the controller is coupled to the servomotor;
   determining whether a frequency of the input signal is constant and smaller than a specific frequency value;
   in response to the frequency of the input signal being constant and smaller than the specific frequency value, switching the mode of the servomotor from the predetermined mode to a pulse position modulation (PPM) or pulse width modulation (PWM) mode, and determining the input signal as a PPM signal or a PWM signal; and
   wherein a control mode of the motor comprises a position mode and a velocity or torque mode; and in response to the mode of the servomotor being switched to the PPM or PWM mode, the method further comprises:
   cleaning up packets in the input signal;
   determining whether the servomotor stops;
   in response to the servomotor stopping, setting the control mode of the motor as the position mode or the velocity or torque mode according to a duty cycle of the input signal, wherein when the control mode of the motor is set as the position mode, the input signal is determined as the PPM signal, and a position of the motor is controlled by the input signal; and when the control mode of the motor is set as the velocity or torque mode, the input signal is determined as the PWM signal, and a rotational speed of the motor is controlled by the input signal; and
   in response to the servomotor not stopping, maintaining the control mode of the motor as a previous control mode.

2. The control method of claim 1, wherein the plurality of candidate modes comprise the PPM or PWM mode and multiple communication modes, and the multiple communication modes correspond to multiple communication protocols, respectively.

3. The control method of claim 1, further comprising:
   in response to the frequency of the input signal being not constant or not smaller than the specific frequency value, determining whether communications between the servomotor and the controller is normal.

4. The control method of claim 3, wherein the step of in response to the frequency of the input signal being not constant or smaller than the specific frequency value, determining whether the communications between the servomotor and the controller is normal comprises:
   in response to the communications between the servomotor and the controller being normal, parsing the input signal and controlling the motor by the input signal; and
   in response to the communications between the servomotor and the controller not being normal, switching the mode of the servomotor from the predetermined mode to one of multiple communication modes, until the communications between the servomotor and the controller becomes normal, wherein the multiple communication modes correspond to multiple communication protocols, respectively.

5. The control method of claim 4, wherein the step of switching the mode of the servomotor from the predetermined mode to said one of the multiple communication modes comprises:
   cleaning up the packets in the input signal;
   setting a baud corresponding to said one of the multiple communication modes; and
   opening or closing multiple switching circuits corresponding to a pull-up resistor and a pull-down resistor, respectively, for resistance-matching between the servomotor and the controller.

6. The control method of claim 1, wherein the specific frequency value is 2 KHz.

7. The control method of claim 1, wherein the step of in response to the servomotor stopping, setting the control mode of the motor as the position mode or the velocity or torque mode according to the duty cycle of the input signal comprises:
   determining whether the duty cycle of the input signal is equal to a specific ratio;
   in response to the duty cycle of the input signal being equal to the specific ratio, setting the control mode of the motor as the velocity or torque mode; and
   in response to the duty cycle of the input signal being not equal to the specific ratio, setting the control mode of the motor as the position mode.

8. The control method of claim 7, wherein the specific ratio is 50%.

9. The control method of claim 7, wherein the step of in response to the duty cycle of the input signal being not equal to the specific ratio, setting the control mode of the motor as the position mode comprises:
   setting an angle resolution of the motor; and
   setting a maximum angle value and a minimum angle value of the motor.

10. A processing circuit applied to a servomotor, wherein the servomotor comprises a motor, and the processing circuit comprises:
    an input interface, arranged to receive an input signal from a controller for controlling the motor, wherein the controller is coupled to the servomotor; and
    a control circuit, arranged to:
    set a mode of the servomotor as a predetermined mode corresponding to a predetermined communication protocol;
    determine whether the frequency of the input signal is constant and smaller than a specific frequency value; and
    in response to the frequency of the input signal being constant and smaller than the specific frequency value, switch the mode of the servomotor to a pulse position modulation (PPM) or pulse width modulation (PWM) mode, and determine the input signal as a PPM signal or a PWM signal;
    wherein a control mode of the motor comprises a position mode and a velocity or torque mode, and regarding switching the mode of the servomotor from the predetermined mode to the PPM or PWM mode, the control circuit is further arranged to:
    clean up packets in the input signal;
    determine whether the servomotor stops;
    in response to the servomotor stopping, set the control mode of the motor as the position mode or the velocity or torque mode according to a duty cycle of the input signal, wherein when the control mode of the motor is set as the position mode, the input signal is determined as the PPM signal, and a position of the motor is controlled by the input signal; and when the control mode of the motor is set as the velocity or torque mode, the input signal is determined as the PWM signal, and a rotational speed of the motor is controlled by the input signal; and in response to the servomotor not stopping, maintain the control mode of the motor as a previous control mode.

11. The processing circuit of claim 10, wherein the plurality of candidate modes comprise the PPM or PWM mode and multiple communication modes, and the multiple communication modes correspond to multiple communication protocols, respectively.

12. The processing circuit of claim 10, wherein in response to the frequency of the input signal being not constant or not smaller than the specific frequency value, the control circuit is further arranged to determine whether communications between the servomotor and the controller is normal.

13. The processing circuit of claim 12, wherein regarding determining whether the communications between the servomotor and the controller is normal, the control circuit is further arranged to:

in response to the communications between the servomotor and the controller being normal, parse the input signal and control the motor by the input signal; and in response to the communications between the servomotor and the controller not being normal, switch the mode of the servomotor from the predetermined mode to one of multiple communication modes, until the communications between the servomotor and the controller becomes normal, wherein the multiple communication modes correspond to multiple communication protocols, respectively.

14. The processing circuit of claim 13, wherein the processing circuit further comprises multiple switching circuits corresponding to a pull-up resistor and a pull-down resistor, respectively, and regarding switching the mode of the servomotor from the predetermined mode to said one of the multiple communication modes, the control circuit is further arranged to:

clean up the packets in the input signal;

set a baud corresponding to said one of the multiple communication modes; and open or close the multiple switching circuits for resistance-matching between the servomotor and the controller.

15. The processing circuit of claim 10, wherein the specific frequency value is 2 KHz.

16. The processing circuit of claim 11, wherein regarding setting the control mode of the motor as the position mode or the velocity or torque mode according to the duty cycle of the input signal, the control circuit is further arranged to:

determine whether the duty cycle of the input signal is equal to a specific ratio;

in response to the duty cycle of the input signal being equal to the specific ratio, set the control mode of the motor as the velocity or torque mode; and in response to the duty cycle of the input signal being not equal to the specific ratio, set the control mode of the motor as the position mode.

17. The processing circuit of claim 16, wherein the specific ratio is 50%.

18. The processing circuit of claim 16, wherein regarding setting the control mode of the motor as the position mode, the control circuit is further arranged to:

set an angle resolution of the motor; and set a maximum angle value and a minimum angle value of the motor.

* * * * *